United States Patent
Cunningham et al.

(10) Patent No.: US 10,290,002 B1
(45) Date of Patent: May 14, 2019

(54) PREDICTING REFUND PROCESSING TIME

(71) Applicant: Capital One Services, LLC, McLean, VA (US)

(72) Inventors: Sarah J. Cunningham, Arlington, VA (US); Gaurang Bhatt, Herndon, VA (US); Sophie Bermudez, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 10 days.

(21) Appl. No.: 16/040,152

(22) Filed: Jul. 19, 2018

(51) Int. Cl.
*G06Q 40/00* (2012.01)
*G06Q 20/40* (2012.01)
*G06Q 10/08* (2012.01)

(52) U.S. Cl.
CPC ....... *G06Q 20/407* (2013.01); *G06Q 10/0837* (2013.01); *G06Q 10/0838* (2013.01)

(58) Field of Classification Search
CPC .. G06Q 10/0838; G06Q 40/00; G06Q 20/407; G06Q 10/0837
See application file for complete search history.

(56) References Cited

U.S. PATENT DOCUMENTS

| | | | |
|---|---|---|---|
| 7,797,164 B2 | 9/2010 | Junger et al. | |
| 8,156,007 B1 | 4/2012 | Anthony et al. | |
| 8,090,649 B2 | 7/2012 | Galit et al. | |
| 8,311,895 B1 | 11/2012 | Murugan et al. | |
| 9,652,732 B1 | 5/2017 | Barstad et al. | |
| 2005/0004819 A1* | 1/2005 | Etzioni | G06Q 10/02 705/5 |
| 2009/0172093 A1 | 7/2009 | Matsubara | |
| 2012/0246064 A1 | 9/2012 | Balkow | |
| 2014/0207634 A1* | 7/2014 | Edmonds | G06Q 40/025 705/31 |
| 2015/0105142 A1* | 4/2015 | Amaitis | G07F 17/3288 463/25 |

(Continued)

FOREIGN PATENT DOCUMENTS

WO 01/67344 9/2001

OTHER PUBLICATIONS

An experimental examination of alternative forms of Web assurance for business-to-consumer e-commerce, Mauldin, Elaine; Arunachalam, Vairam. Journal of Information Systems: 33(34). American Accounting Association. (Jan. 2001-Mar. 2001).*

(Continued)

*Primary Examiner* — Lalita M Hamilton
(74) *Attorney, Agent, or Firm* — Harrity & Harrity, LLP

(57) ABSTRACT

A device may obtain historical refund data, the historical refund data including at least one of: merchant refund time data, shipping time data, or user account refund time data. The device may generate, based on the historical refund data, a refund model, the refund model being trained to receive, as input, at least one of: merchant data identifying a merchant, shipping data identifying a shipping entity, or account data identifying a user account entity. The device may receive return data indicating that a user account is to be credited, the return data including the merchant data. The device may determine a predicted refund time based on the return data and the refund model, and perform an action based on the predicted refund time.

20 Claims, 7 Drawing Sheets

(56) References Cited

U.S. PATENT DOCUMENTS

2016/0104188 A1\* 4/2016 Glyman ............. G06Q 30/0234
 705/14.34
2017/0053278 A1\* 2/2017 Gerard ................. G06Q 20/407
2018/0007202 A1\* 1/2018 Bathe .................. H04M 3/5183

OTHER PUBLICATIONS

John Egan, "How long does a credit card refund take?", https://www.creditkarma.com/credit-cards/i/how-long-credit-card-refund/, Nov. 13, 2017, 7 pages.

\* cited by examiner

PREDICTING REFUND PROCESSING TIME

BACKGROUND

When a consumer conducts a transaction with a merchant, such as a transaction for goods and/or services, the consumer often has an opportunity to obtain a whole or partial refund of an amount paid for the transaction based on various circumstances (e.g., circumstances where products and/or services are non-compliant, defective, undesired, returned, and/or the like). The amount of time it takes for a refund to be processed, and for the refunded amount to be credited to the consumer, may vary.

SUMMARY

According to some implementations, a method may comprise: obtaining, by a device, historical refund data, the historical refund data including at least one of: merchant refund time data, shipping time data, or user account refund time data; generating, by the device and based on the historical refund data, a refund model, the refund model being trained to receive, as input, at least one of: merchant data identifying a merchant, shipping data identifying a shipping entity, or account data identifying a user account entity; receiving, by the device, return data indicating that a user account is to be credited, the return data including the merchant data; determining, by the device, a predicted refund time based on the return data and the refund model; and performing, by the device, an action based on the predicted refund time.

According to some implementations, a device may comprise: one or more memories; and one or more processors, communicatively coupled to the one or more memories, configured to: receive return data indicating that a user account is to be credited, the return data including at least one of: merchant data identifying a merchant, shipping data identifying a shipping entity, or account data identifying a user account entity; provide the return data, as input, to a refund model trained to provide, as output, a predicted refund time, the predicted refund time specifying a time at which the user account is expected to be credited, and the refund model having been trained using historical refund data; receive the predicted refund time from the refund model; and perform an action based on the predicted refund time.

According to some implementations, a non-transitory computer-readable medium may store instructions, the instructions comprising: one or more instructions that, when executed by one or more processors, cause the one or more processors to: receive, from a user device, return data indicating that a user account associated with the user device is to be credited, the return data including merchant data identifying a merchant; determine a predicted refund time based on the merchant data, the predicted refund time specifying a time at which the user account is expected to be credited for a refund amount, and the determination being made based on a refund model that was previously trained using historical refund data; identify, for the user account, a due date for an upcoming payment due associated with the user account; and perform an action based on the predicted refund time, the due date, and the refund amount.

DETAILED DESCRIPTION

Figure 1A:
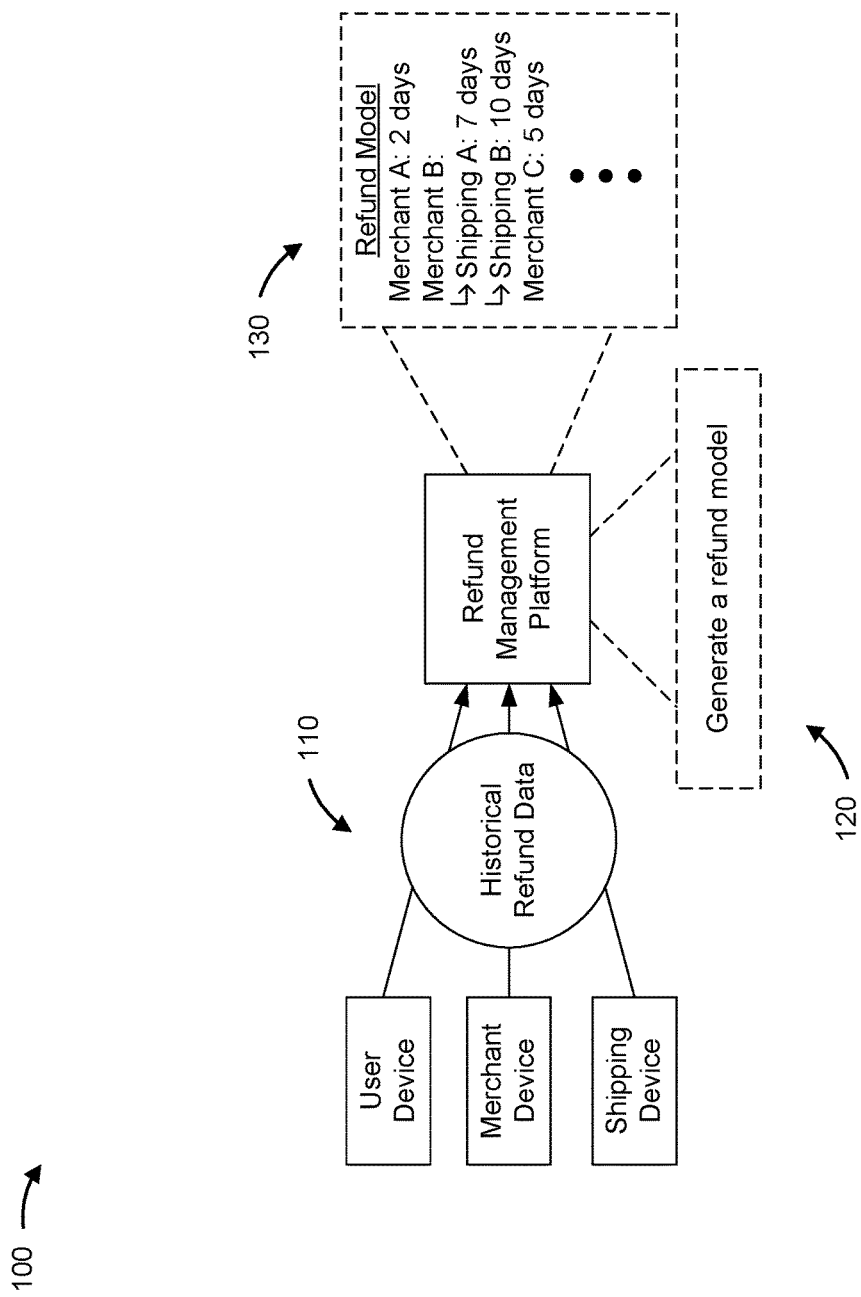
FIGS. 1A-1B are diagrams of example implementations described herein.

The following detailed description of example implementations refers to the accompanying drawings. The same reference numbers in different drawings may identify the same or similar elements.

In a situation where a consumer pays for a good or service with a user spending account (e.g., a bank account, credit card account, checking account, and/or the like), an entity associated with the user account (e.g., a user account entity, such as a bank, credit card company, and/or the like) facilitates the transfer of funds from the user spending account to an account associated with a merchant associated with the good or service. In a situation where the consumer wishes to obtain a refund, the amount of time it takes for funds associated with the refund to be available in the user spending account may vary, e.g., based on an amount of time it takes for the merchant to provide the user account entity with instructions to process the refund, based on a shipping time in situations where the consumer has to ship a product to the merchant before the refund is processed by the merchant, and/or an amount of time that it takes the user account entity to transfer funds back into the consumer's user spending account. Because the time it takes to process a refund varies, consumers and merchants alike may not be aware of how long a refund will take, which may contribute to an inability to make financial plans based on the refund.

Some implementations, described herein, provide a refund management platform (e.g., a server computer, personal computer, cloud computing platform, and/or the like) to predict refund processing time. For example, the refund management platform may obtain historical refund data from various sources (e.g., user devices associated with users/consumers, merchant devices associated with merchants, shipping devices associated with shipping entities, and/or the like) and use the historical refund data to train a refund model to provide a predicted refund time that estimates how long it takes for a refund to be credited to a user account associated with a transaction. The historical refund data may indicate, for example, how long it takes for various merchants to provide instructions to user account entities, how long it takes for various shipping entities to ship products, how long it takes for the user account entity to transfer funds, and/or the like. The model may be trained using a variety of machine learning techniques, and the model may use, as input, merchant data (e.g., data identifying a merchant), shipping data (e.g., data identifying the shipping method, shipping entity, and/or the like), user data (e.g., data identifying when a user triggered the beginning of a refund process), and/or the like. The predicted refund time produced by a refund model may, in some implementations, specify a measure of confidence in the predicted refund time, which may be, for example, a time, period of time, time range, and/or the like. Based on the predicted refund time, the refund management platform may perform a variety of actions, such as notifying the user and/or merchant involved in the refund, making various calculations and/or predictions regarding the user's user account and/or payment due associated with the user account, providing a recommendation to the user based on the predicted refund time and the user account, and/or the like.

In this way, the refund management platform may enable merchants, consumers, and/or the like, to receive predictions regarding refund processing time, which may enable the merchants, consumers, and/or the like, to use the predictions in a variety of ways. For example, predicted refund processing times may be used for financial planning (e.g., making plans based on when a refund will be credited to a user account), customer service (e.g., providing a consumer or merchant with knowledge regarding when a refund is predicted to be processed), and/or the like. Several different stages of the process for predicting refund processing time are automated, which may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for predicting refund processing time conserves computing resources (e.g., processor resources, memory resources, and/or the like) that would otherwise be wasted by using manual investigative processes for attempting to determine when a refund will be processed.

Figure 1B:
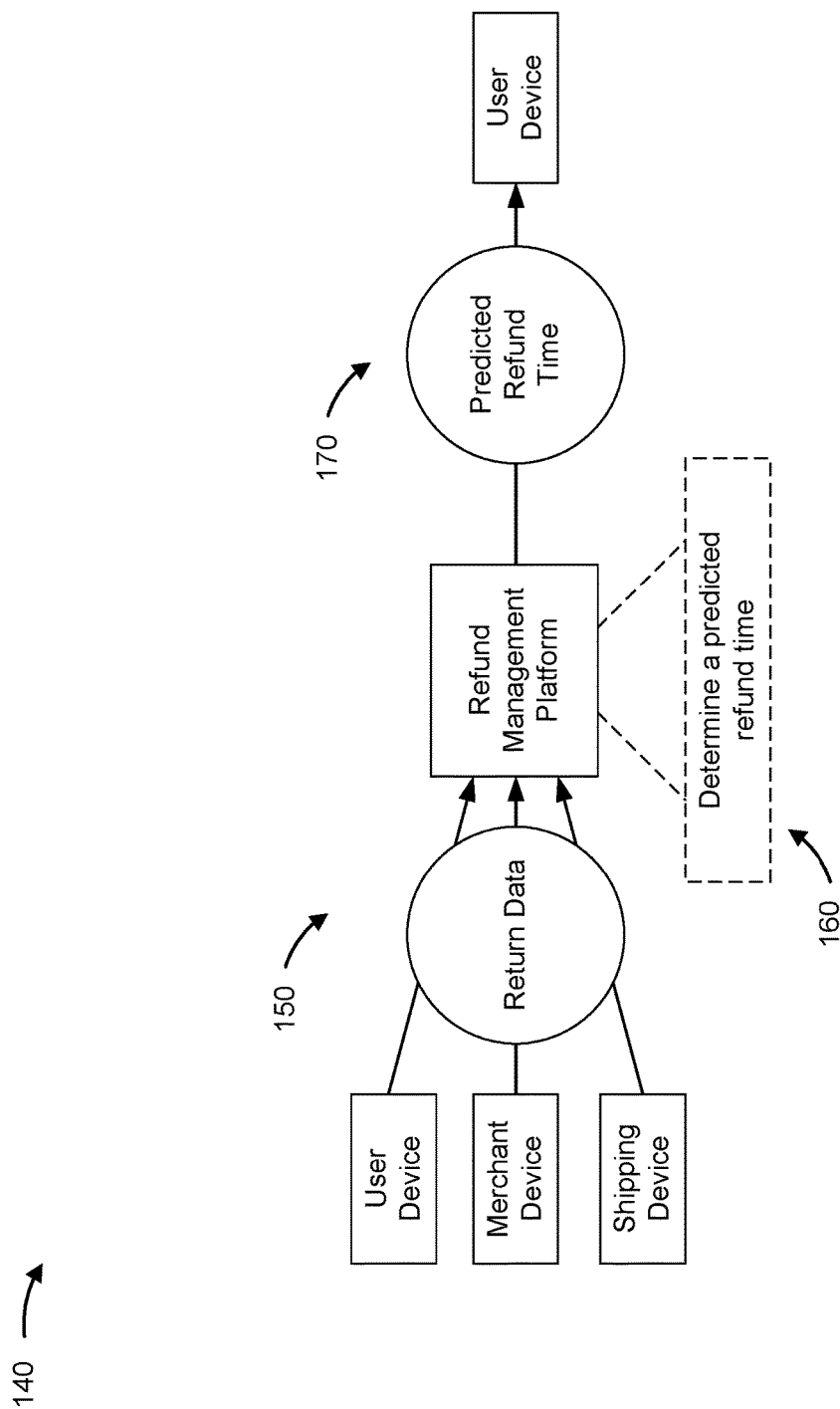

FIGS. 1A-1B are diagrams of example implementations described herein. As shown in FIG. 1A, example implementation 100 includes a user device (e.g., a personal computer, mobile device, server computer, and/or the like); a merchant device (e.g., a personal computer, server computer, point-of-sale device, and/or the like); a shipping device (e.g., a personal computer, server computer, shipment tracking device, point-of-sale device, and/or the like); and a refund management platform (e.g., a server computer, a cloud computing platform, and/or the like). While the devices of implementation 100 are depicted separately, in some implementations, the functionality of one or more of the devices of implementation 100 may be included in another device, or may be included in multiple, distributed devices.

As shown by reference number 110, the refund management platform receives refund data from a user device, a merchant device, and/or a shipping device. The refund data received by the refund management platform in the example implementation 100 may be associated with prior refunds that have been processed, providing the refund management platform with historical occurrences from which a predictive model may be generated (e.g., as described in further detail, below). Refund data may include a variety of information related to a refund. For example, refund data may include data indicating the subject of the refund (e.g., product(s) and/or service(s) being refunded), data identifying a refund amount (e.g., an amount to be refunded to a user account), data identifying a user (e.g., consumer), data identifying a user account (e.g., a bank account, credit card account, and/or the like), data identifying a merchant, data identifying a merchant account (e.g., a bank account), data identifying a time between the merchant receiving an indication that the user is requesting a refund and the merchant notifying a user account entity (e.g., a bank with access to the user account and/or merchant account) to process the refund, data identifying a shipping method (e.g., shipping company used, mode of transit, and/or the like) in a situation where a product is shipped by the user to the merchant, data identifying a shipping time (e.g., overnight shipping, two-day shipping, five business day shipping, and/or the like) associated with the shipping method, data identifying a user shipping location (e.g., a location from which the user will ship a product to the merchant), data identifying a user shipping time (e.g., an amount of time it takes a user to take a product to a shipping entity location for shipping), data identifying a merchant shipping location (e.g., a location from which the merchant will receive a product shipped by a user), data identifying a time between the merchant receiving a product returned via shipping and the merchant notifying a user account entity, and/or other information that may facilitate determining a refund time associated with a refund.

In some implementations, the user device, merchant, and/or shipping device may include hardware and/or software capable of providing refund data to the refund management platform. For example, the user device may include a mobile phone operating an application designed to detect when a refund is to occur and, in response to detecting the occurrence of a refund, automatically send refund data to the refund management platform. By way of example, the user device may include an application that scans information from a user's messages, electronic mail, and/or the like, for language indicating a return or refund, and automatically obtaining the refund data from the scanned message, electronic mail, and/or the like. Another example application may include a browser extension application capable of reading refund data from a web page displayed using a web browser, capable of detecting a return page associated with an online merchant, capable of scraping refund data from web pages displayed in a web browser, and/or the like. As another example, the user device may include an application that enables a user associated with the user device to manually submit refund data to the refund management platform. As yet another example, the merchant device may include a point-of-sale device that includes software designed to automatically provide the refund management platform with refund data when a refund is being processed by the point-of sale device. As a further example, the merchant device may include a web server that includes software designed to automatically provide the refund management platform with refund data when a refund is being processed by the web server. An example shipping device may include a server computer designed to track shipments and automatically provide the refund management platform with refund data when a refund is being handled by a shipping entity associated with the shipping device. These are merely examples of user devices, merchant devices, and shipping devices that can provide refund data to the refund management platform.

While the example implementation 100 depicts the refund data coming from a single user device, merchant device, and/or shipping device, in some implementations, refund data may come from multiple user devices, merchant devices, and/or shipping devices. In some implementations, refund data may be received from hundreds, thousands, millions, or more user devices, merchant devices, and/or shipping devices. In addition, a single user device, merchant device, and/or shipping device may provide refund data multiple times (e.g., for one or more refunds). In this way, the refund management platform obtains refund data that may be used to generate a refund model for predicting refund processing time.

As shown by reference number 120, the refund management platform generates a refund model. The refund model may be generated based on the refund data provided by user device(s), merchant device(s), and/or shipping device(s). In some implementations, the refund management platform may generate a refund model by training the refund model using the refund data as training data and applying one or more supervised machine learning techniques, such as linear regression, non-linear regression, logistic regression, and/or the like. In some implementations, the refund model may be generated based on a calculation associated with the refund data, such as the calculation of historical averages (e.g., average refund processing time associated with a merchant, product, user account entity, and/or the like), median processing times (e.g., median shipping time for various shipping methods, median time for a refund to be credited to a user account by a user account entity, and/or the like), or other measures associated with historical refund data that may be used to predict refund processing times given known information.

In some implementations, the refund model is trained to provide further detail regarding the predicted refund time, such as a prediction regarding which portions of the predicted refund time are attributable to which portions of a refund process. For example, the refund model may be trained to produce, as output, a user delay (e.g., a delay between the user being approved for a refund and providing a product to a shipping entity for return), a predicted shipping delay (e.g., a delay between the shipping entity receiving the product and the merchant receiving the product), a merchant delay (e.g., a delay between the merchant receiving the product and a user account entity being notified of the refund), and a user account entity delay (e.g., a delay between the user account entity receiving refund data and the refund being credited to a user account).

As shown by reference number 130, the refund model generated by the refund management platform is designed to receive, as input, at least a portion of refund data (e.g., data identifying a merchant, shipping entity, refund amount, user account entity, and/or the like). The refund model may use the input to produce a predicted refund time. The predicted refund time may indicate a particular date, number of days, number of hours, range of hours or days, and/or the like. As shown in the example implementation 100, the refund model may provide a predicted refund time based on the input (e.g., the refund data). For example, given input identifying Merchant A, the refund model may produce a predicted refund time of 2 days. Given input identifying Merchant B with a shipping method, Shipping A, the refund model may produce a predicted refund time of 7 days. Given input identifying Merchant B with a shipping method, Shipping B, the refund model may produce a predicted refund time of 10 days. Given input identifying Merchant C, the refund model may produce a predicted refund time of 5 days. As noted above, other forms of refund data may be used as input, and the predicted refund time may also take a variety of forms (e.g., days, hours, time range, and/or the like).

In some implementations, the refund model may provide, in addition to the predicted refund time, a measure of confidence associated with the predicted refund time. The measure of confidence provides an indication of confidence, or certainty, produced by the refund model, that the predicted refund time is correct. For example, in a situation where the refund model has relatively high confidence in a predicted refund time (e.g., based on the refund data provided as input), the refund model may produce a high measure of confidence that the predicted refund time is accurate (e.g., a 90% measure of confidence on a scale from 0% to 100% confidence). In a situation where the refund model has relatively low confidence in the predicted refund time, the refund model may produce a low measure of confidence that the predicted refund time is accurate (e.g., a 35% measure of confidence on a scale from 0% to 100%). In some implementations, multiple measures of confidence may be provided by the refund model, e.g., in a situation where multiple times are included in predicted refund times. For example, in a situation where the predicted refund time is 3-5 days, the refund model may provide three measures of confidence, one for 3 days, one for 4 days, and one for 5 days. As another example, in a situation where multiple shipping methods are available but were not included in refund data, the refund model may provide two separate predicted refund times (e.g., one predicted refund time for a first shipping method and another predicted refund time for as second shipping method) and a measure of confidence for each of the predicted refund times.

In this way, the refund management platform may generate a refund model that is capable of providing a prediction regarding when a refund will be credited to a user account. The ability to predict when a refund will be credited to a user account may facilitate a variety of actions, described in further detail below.

As shown in FIG. 1B, example implementation 140 includes a user device (e.g., the same user device or a different user device than the user device depicted in implementation 100); a merchant device (e.g., the same merchant device or a different merchant device than the merchant device depicted in implementation 100); a shipping device (e.g., the same shipping device or a different shipping device than the shipping device depicted in implementation 100); and the refund management platform.

As shown by reference number 150, the refund management platform receives return data from the user device, the merchant device, and/or the shipping device. The return data may include a variety of information associated with a refund of a product or service. For example, the return data may include information similar to the information provided in the historical refund data, described with reference to FIG. 1A, above. By way of example, the return data may include information identifying a merchant associated with the return, information identifying a product associated with the return, information identifying a user account associated with the return, information identifying a shipping entity associated with the return, and/or the like.

In some implementations, the device providing the return data (e.g., the user device, the merchant device, and/or the shipping device) may use software to facilitate the provision of return data to the refund management platform. For example, the user device may include an application designed to receive user input associated with a refund, the user input may include the return data, and the application may cause the user device to provide the user input (e.g., the return data) to the refund management platform. As another example, the merchant device may be a point-of-sale device that operates software designed to automatically send return data to the refund management platform when the point-of-sale device is used to process a refund. In some implementations, the user device, merchant device, and/or shipping device may provide return data to an intermediary device (e.g., an intermediary data storage device) from which the refund management platform may obtain the return data.

As shown by reference number 160, the refund management platform determines a predicted refund time based on the return data. In some implementations, the refund management platform provides the return data to a refund model that is trained to produce a predicted refund time, such as a refund model described above with reference to FIG. 1A. As described above, the predicted refund time may take a variety of forms, including a predicted date, number of days, number of hours, range of time, and/or the like. In some implementations, the predicted refund time may be associated with a measure of confidence (e.g., also provided by the refund model). The measure of confidence may provide an indication as to the likelihood that the predicted refund time is accurate.

In some implementations, the predicted refund time may include or be associated with data that provides further detail on the predicted refund time, such as a prediction regarding which portions of the predicted refund time are attributable to which portions of the refund process. For example, the predicted refund time may include a predicted user delay (e.g., a delay between the user being approved for a refund and providing a product to a shipping entity for return), a predicted shipping delay (e.g., a delay between the shipping entity receiving the product and the merchant receiving the product), a predicted merchant delay (e.g., a delay between the merchant receiving the product and a user account entity being notified of the refund), and a predicted user account entity delay (e.g., a delay between the user account entity receiving return data and the refund being credited to a user account).

In some implementations, the refund management platform may determine the predicted refund time based on a mapping of at least a portion of return data to a predicted refund time. For example, in some situations, predicted refund times may have been previously determined for various types of return data, and in these situations, the refund management platform may use a previously determined predicted refund time (e.g., as opposed to a predicted refund time calculated based on a refund model). For example, in a situation where historical refund data associated with a particular merchant has typically resulted in a refund time of 6 days, the refund management system may determine, for any return data that specifies the particular merchant, the predicted refund time should be 6 days. In this situation, the refund model may include a mapping of return data (e.g., the particular merchant, in this situation) to a predicted refund time.

In this way, the refund management platform may determine a predicted refund time associated with return data. The predicted refund time provides an indication as to the likely time at which a refund will be credited to a user account. As described in further detail below, the predicted refund time may be used to perform and/or facilitate the performance of a variety of actions.

As shown by reference number 170, the refund management platform performs an action based on the predicted refund time, such as providing the predicted refund time to a user device associated with the refund (e.g., the same user device that provided the return data to the refund management platform, or a different user device). For example, the refund management platform may include or otherwise be associated with a device (e.g., an application server) capable of communicating the predicted refund time to the user device (e.g., via a text message, a software application operating on the user device, an electronic mail, and/or the like). The user device to which the predicted refund time is provided may be a user device that is associated with a user account associated with the return data. In some implementations, the refund management platform may also provide the user device with one or more measures of confidence associated with the predicted refund time. In this way, the refund management platform may provide a user of the user device with knowledge regarding the time a refund is predicted to be credited to a user account associated with the user.

In some implementations, the refund management platform may identify a user account associated with the return data. For example, a bank account, credit card account, and/or the like, may be identified from information included in the return data. Using information about the user account (e.g., included in or otherwise accessible to the refund management platform), the refund management platform may identify a due date for a payment due on the user account. After identifying the due date, the refund management platform may provide the user device with data indicating that, based on the predicted refund time, the refund is likely to be credited to the user account before, or after, the due date for the payment due on the user account. This may enable the user to make an informed decision regarding whether to account for the amount of the refund when making a payment associated with the user account.

In some implementations, based on the predicted refund time being before the due date identified for the payment due on the user account, the refund management platform may calculate an updated payment due. For example, in a situation where a user account may have a $100 payment due, but a predicted refund time indicates that a refund of $20 is likely to be credited to the user account before the $100 payment is due, the refund management platform may calculate an $80 updated payment due (e.g., $100–$20=$80). In this situation, the refund management platform may provide the user device with data indicating that the user may pay the updated payment due ($80), rather than the payment due ($100), based on the predicted refund time.

In some implementations, the refund management platform may proactively provide a predicted refund time to a user device, without the user having returned a product or service. For example, based on data identifying an upcoming due date associated with a user account, the refund management platform may automatically determine a predicted refund time associated with a product or service (e.g., from transaction data associated with the user device, user account, and/or the like) and provide the user device with data indicating that the user should return a product or service prior to a particular date so that the refund is likely to be credited before the upcoming due date. In some implementations, the refund management platform may selectively provide the predicted refund time proactively. For example, based on information relevant to the user of the user device, or the merchant, the refund management platform may determine to provide a proactive notification regarding the predicted refund time. For example, in a situation where the user has returned a product/service associated with a particular merchant before (e.g., determined based on transaction history associate with a user account), or a situation where the merchant is associated with a high volume of returns (e.g., determined based on transaction history associated with other user accounts and/or an account associated with the merchant), the refund management platform may use the information regarding prior returns to determine to provide the user with a notification regarding the predicted refund time. In some implementations, the notification may be based on a return policy associated with a merchant. For example, in a situation where a merchant has a deadline specified in a return policy (e.g., a publicly available return policy previously provided to the refund management platform, a return policy provided by user input, and/or the like), the refund management platform may use the deadline to determine when to provide a proactive notification regarding the predicted refund time.

In some implementations, the refund management platform may use the predicted refund time in a simulated return for a user. For example, the refund management platform may receive a request to simulate a refund, and the refund management platform may use the request to determine, if the user returned a product or service at a particular time associated with the request (e.g., when the request is received, at a specified date/time, and/or the like), a predicted time for the refund to be credited to a user account associated with the user. The predicted time for the refund to be credited may be provided to the user device based on the request, enabling the user of the user device to be aware of the predicted refund time given a particular return date and/or time. In a situation where the user may affect the predicted refund time (e.g., by using a particular shipping method to return a product, by returning a product before a particular time of day, and/or the like), the refund management platform may provide the user device with information specifying how the user may affect the predicted refund time, enabling the user to potentially speed up or delay the time it takes for the refund to be credited to the user's user account.

In some implementations, the refund management platform may provide the predicted refund time to a merchant device (e.g., a merchant device associated with the merchant that is associated with the refund). For example, in a situation where a user returns an item to a retail store for a refund, and the return data provided to the refund management platform identifies the retail store, the refund management platform may provide data indicating the predicted refund time (e.g., with or without confidence score(s)) to a merchant device associated with the retail store. By providing the merchant device with the predicted refund time, the refund management platform provides the merchant with knowledge regarding the merchant's refund performance, which may facilitate making improvements to the merchant's refund handling process (e.g., new software, processes, shipping methods, and/or the like).

In some implementations, the refund management platform may provide the predicted refund time to a shipping device (e.g., a shipping device associated with a shipping entity that is used to ship a product associated with a refund). For example, in a situation where a user returns an item to an e-commerce store for a refund, and the return data provided to the refund management platform identifies the shipping method (e.g., the shipping entity and the shipping method associated with the shipping entity), the refund management platform may provide data indicating the predicted refund time (e.g., with or without confidence score(s)) to a shipping device associated with the shipping entity. By providing the shipping device with the predicted refund time, the refund management platform provides the shipping entity with knowledge regarding the shipping entity's shipping performance and how the performance may affect returns and/or refunds associated with the shipping entity's customers, which may facilitate making improvements to the shipping entity's shipping process (e.g., new software, processes, shipping methods, and/or the like).

In some implementations, the action(s) taken by the refund management platform may depend on the confidence score(s) associated with the predicted refund time. For example, in a situation where the refund management platform makes recommendations regarding an amount a user should pay for an upcoming payment due associated with a user account, the refund management platform may use a threshold confidence score to determine wither to make the recommendation. By way of example, using a threshold confidence score of 90%, the refund management platform may only suggest that a user pay less than an amount due in a situation where the predicted refund time is before the payment due date and is associated with a confidence score that meets the 90% confidence score threshold. In a situation where the confidence score does not meet the 90% confidence score threshold, the refund management platform may provide a notification regarding the predicted refund time to the user device, but without a recommendation to pay less than an amount due on the corresponding user account.

In some implementations, the refund management platform may receive data indicating when a refund associated with the predicted refund time was credited to the corresponding user account (e.g., an actual refund time). By receiving the actual refund time, the refund management platform may obtain knowledge regarding the accuracy of the prediction provided by the refund management platform. In some implementations, the actual refund time, in combination with the return data used to produce the predicted refund time, may be used as training data to further train and update the refund model, e.g., in a manner designed to improve the refund model when used for future predictions. In this way, the refund model may improve over time, providing more accurate predictions as more predictions are made and more results are provided.

In this way, a refund management platform may enable merchants, consumers, and/or the like, to receive predictions regarding refund processing time, which may enable the merchants, consumers, and/or the like, to use the predictions in a variety of ways. For example, predicted refund processing times may be used for financial planning (e.g., making plans based on when a refund will be credited to a user account), customer service (e.g., providing a consumer or merchant with knowledge regarding when a refund is predicted to be processed), and/or the like. Several different stages of the process for predicting refund processing time are automated, which may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for predicting refund processing time conserves computing resources (e.g., processor resources, memory resources, and/or the like) that would otherwise be wasted by using manual investigative processes for attempting to determine when a refund will be processed.

As indicated above, FIGS. 1A-1B are provided merely as examples. Other examples are possible and may differ from what was described with regard to FIGS. 1A-1B.

Figure 2:
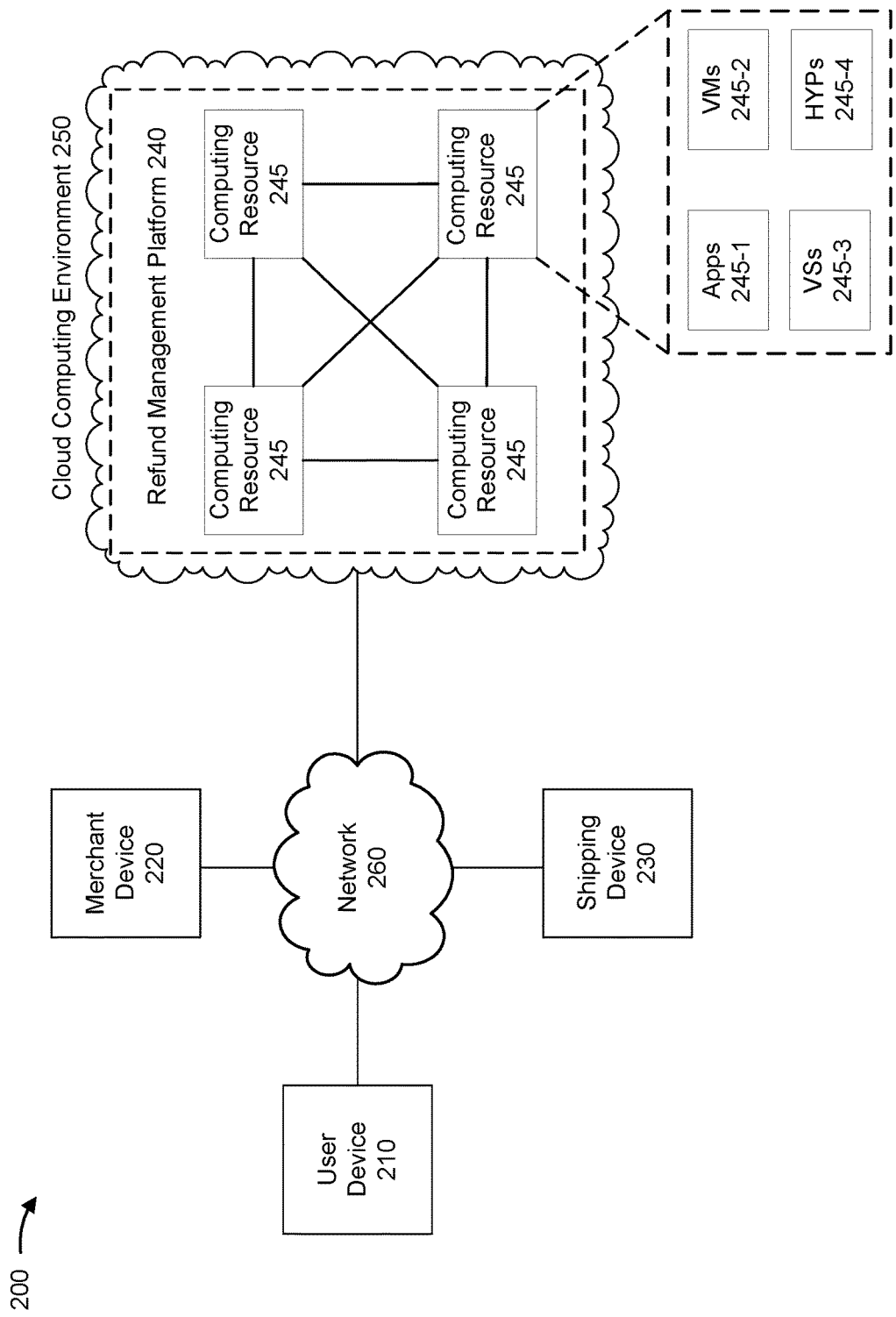
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a merchant device 220, a shipping device 230, a refund management platform 240, a computing resource 245, a cloud computing environment 250, and a network 260. Devices of environment 200 may interconnect via wired connections, wireless connections, or a combination of wired and wireless connections.

User device 210 includes one or more devices capable of receiving, generating, storing, processing, and/or providing information associated with refund data and/or return data. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may include one or more applications designed to facilitate the collection and/or transmittal of refund data and/or return data to refund management platform 240. For example, user device 210 may include an application associated with refund management platform 240, and the application may be designed to receive user input that includes return data and cause user device 210 to transmit the return data to refund management platform 240.

Merchant device 220 includes one or more devices capable of receiving, generating, storing, processing, and/or providing information associated with refund data and/or return data. For example, merchant device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a point-of-sale device, a server device, or a similar type of device. Merchant device 220 may include one or more applications designed to facilitate the collection and/or transmittal of refund data and/or return data to refund management platform 240. For example, merchant device 220 may include an application designed to detect when merchant device 220 is processing a refund and cause merchant device 220 to transmit return data associated with the refund to refund management platform 240.

Shipping device 230 includes one or more devices capable of receiving, generating, storing, processing, and/or providing information associated with refund data and/or refund data. For example, shipping device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a point-of-sale device, a server device, or a similar type of device. Shipping device 230 may include one or more applications designed to facilitate the collection and/or transmittal of refund data and/or return data to refund management platform 240. For example, shipping device 230 may include an application designed to detect when shipping device 230 is processing a shipment associated with a refund and cause shipping device 230 to transmit return data (e.g., shipping information) associated with the return to refund management platform 240.

Refund management platform 240 includes one or more devices capable of receiving, generating, storing, processing, and/or providing information associated with refund data and/or return data. For example, refund management platform 240 may include a server device (e.g., a host server, a web server, an application server, etc.), a data center device, or a similar device. For example, refund management platform 240 may be capable of generating a refund model based on historical refund data, determining predicted refund times based on incoming return data, and performing a variety of actions based on the predicted refund times. In some implementations, refund management platform 240 may be associated with a user account entity (e.g., a bank, credit card company, and/or the like), which may provide refund management platform 240 with access to user account information (e.g., payment accounts associated with consumers, merchants, and/or the like), e.g., to facilitate the prediction of refund processing times.

In some implementations, as shown, refund management platform 240 may be hosted in cloud computing environment 250. Notably, while implementations described herein describe refund management platform 240 as being hosted in cloud computing environment 250, in some implementations, refund management platform 240 might not be cloud-based (i.e., may be implemented outside of a cloud computing environment) or might be partially cloud-based.

Cloud computing environment 250 includes an environment that delivers computing as a service, whereby shared resources, services, etc. may be provided to refund management platform 240. Cloud computing environment 250 may provide computation, software, data access, storage, and/or other services that do not require end-user knowledge of a physical location and configuration of a system and/or a device that delivers the services. As shown, cloud computing environment 250 may include refund management platform 240 and computing resource 245.

Computing resource 245 includes one or more personal computers, workstation computers, server devices, or another type of computation and/or communication device. In some implementations, computing resource 245 may host refund management platform 240. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by user device 210. Application 245-1 may eliminate a need to install and execute the software applications on user device 210. For example, application 245-1 may include software associated with refund management platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user (e.g., user device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
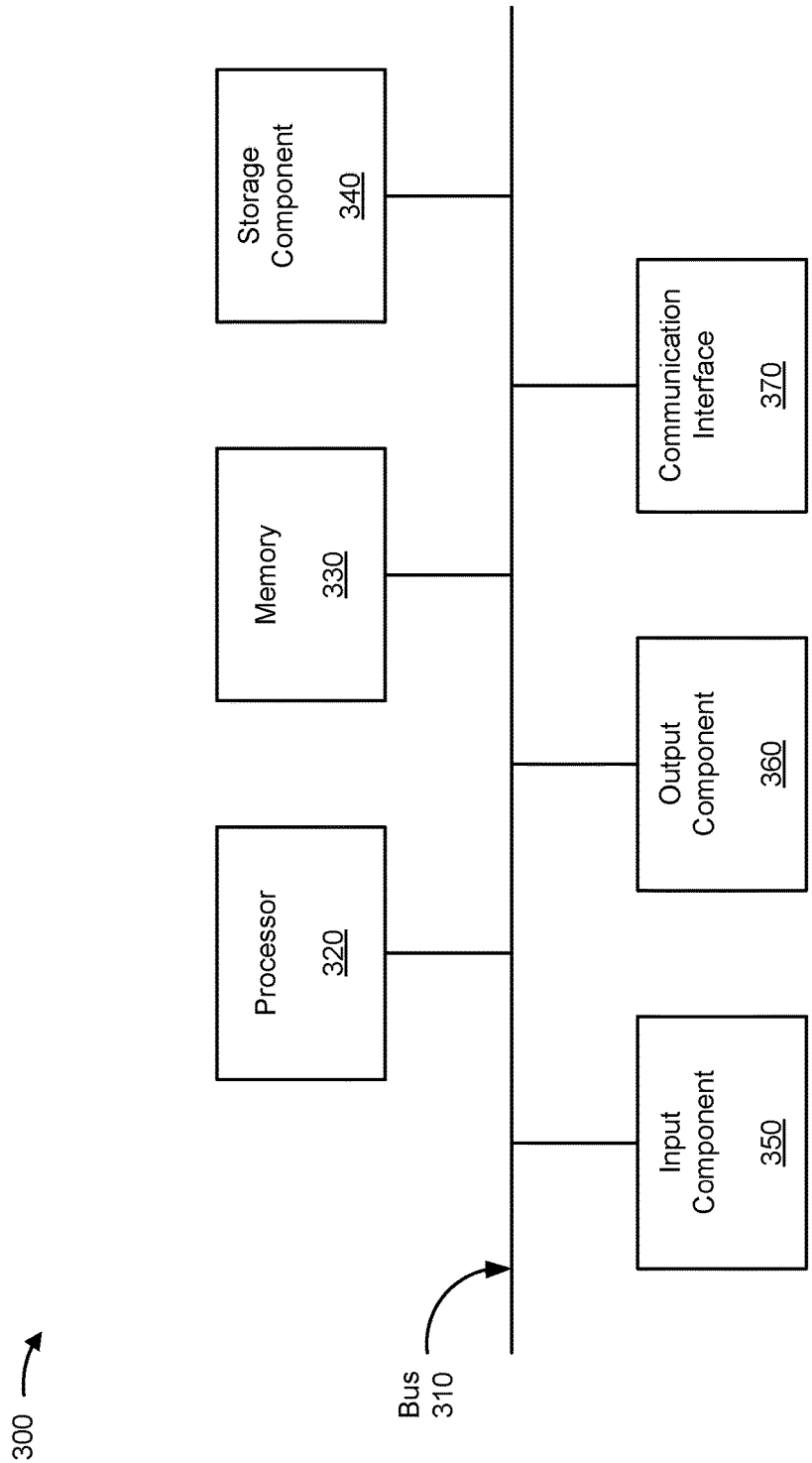
FIG. 3 is a diagram of example components of one or more devices of FIG. 2.

FIG. 3 is a diagram of example components of a device 300. Device 300 may correspond to user device 210, merchant device 220, shipping device 230, refund management platform 240, and/or computing resource 245. In some implementations, user device 210, merchant device 220, shipping device 230, refund management platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
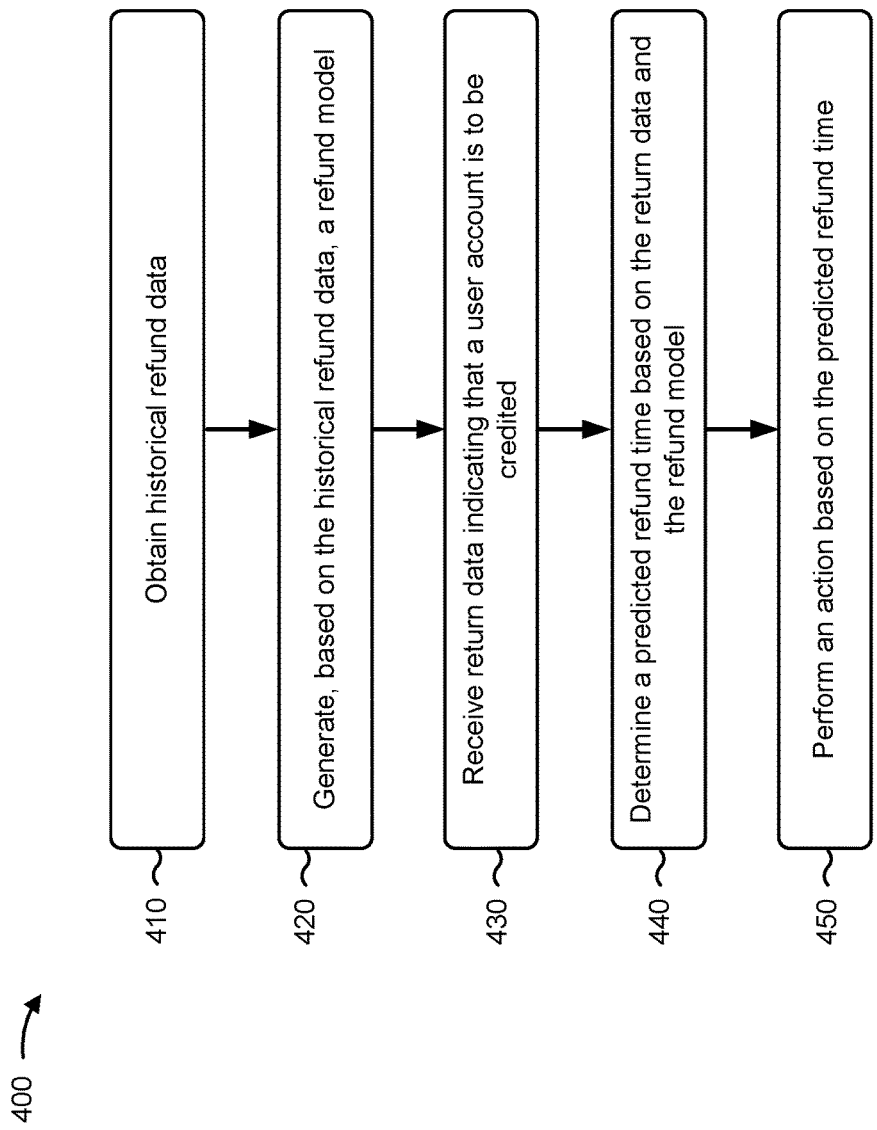
FIGS. 4-6 are flow charts of example processes for predicting refund processing time.

FIG. 4 is a flow chart of an example process 400 for predicting refund processing time. In some implementations, one or more process blocks of FIG. 4 may be performed by a refund management platform (e.g., refund management platform 240). In some implementations, one or more process blocks of FIG. 4 may be performed by another device or a group of devices separate from or including the refund management platform, such as a user device (e.g., user device 210), a merchant device (e.g., merchant device 220), a shipping device (e.g., shipping device 230), and/or the like.

As shown in FIG. 4, process 400 may include obtaining historical refund data (block 410). For example, the refund management platform (e.g., using computing resource 245, processor 320, memory 330, storage component 340, input component 350, communications interface 370, and/or the like) may obtain historical refund data, as described, for example, in connection with FIGS. 1A and 1B. In some implementations, the historical refund data may include at least one of: merchant refund time data, shipping time data, or user account refund time data.

As further shown in FIG. 4, process 400 may include generating, based on the historical refund data, a refund model (block 420). For example, the refund management platform (e.g., using computing resource 245, processor 320, memory 330, storage component 340, and/or the like) may generate, based on the historical refund data, a refund model, as described, for example, in connection with FIGS. 1A and 1B. In some implementations, the refund model may be trained to receive, as input, at least one of: merchant data identifying a merchant, shipping data identifying a shipping entity, or account data identifying a user account entity.

As further shown in FIG. 4, process 400 may include receiving return data indicating that a user account is to be credited (block 430). For example, the refund management platform (e.g., using computing resource 245, processor 320, memory 330, storage component 340, input component 350, communications interface 370, and/or the like) may receive return data indicating that a user account is to be credited, as described, for example, in connection with FIGS. 1A and 1B. In some implementations, the return data may include merchant data.

As further shown in FIG. 4, process 400 may include determining a predicted refund time based on the return data and the refund model (block 440). For example, the refund management platform (e.g., using computing resource 245, processor 320, memory 330, storage component 340, and/or the like) may determine a predicted refund time based on the return data and the refund model, as described, for example, in connection with FIGS. 1A and 1B.

As further shown in FIG. 4, process 400 may include performing an action based on the predicted refund time (block 450). For example, the refund management platform (e.g., using computing resource 245, processor 320, memory 330, storage component 340, input component 350, output component 360, communications interface 370, and/or the like) may perform an action based on the predicted refund time, as described, for example, in connection with FIGS. 1A and 1B.

Process 400 may include additional implementations, such as any single implementation or any combination of implementations described below and/or in connection with one or more other processes described elsewhere herein.

In some implementations, the historical refund data is received from one or more user devices, and each user device included in the one or more user devices is associated with a corresponding user account. In some implementations, the historical refund data is received from one or more merchant devices, and each merchant device included in the one or more merchant devices is associated with a corresponding merchant.

In some implementations, the historical refund data is received from one or more shipping devices, and each shipping device included in the one or more shipping devices is associated with a corresponding shipping entity.

In some implementations, the merchant refund time data indicates a period of time between the merchant receiving refund instructions and the user account entity receiving credit instructions to credit an amount associated with the credit instructions.

In some implementations, the shipping time data indicates a period of time between the shipping entity receiving a product and the merchant receiving the product. In some implementations, the user account refund time data indicates a period of time between the user account entity receiving credit instruct instructions and the user account entity crediting a refund amount. In some implementations, performing the action based on the predicted refund time includes providing, to a merchant device associated with the merchant data, with data indicating the predicted refund time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
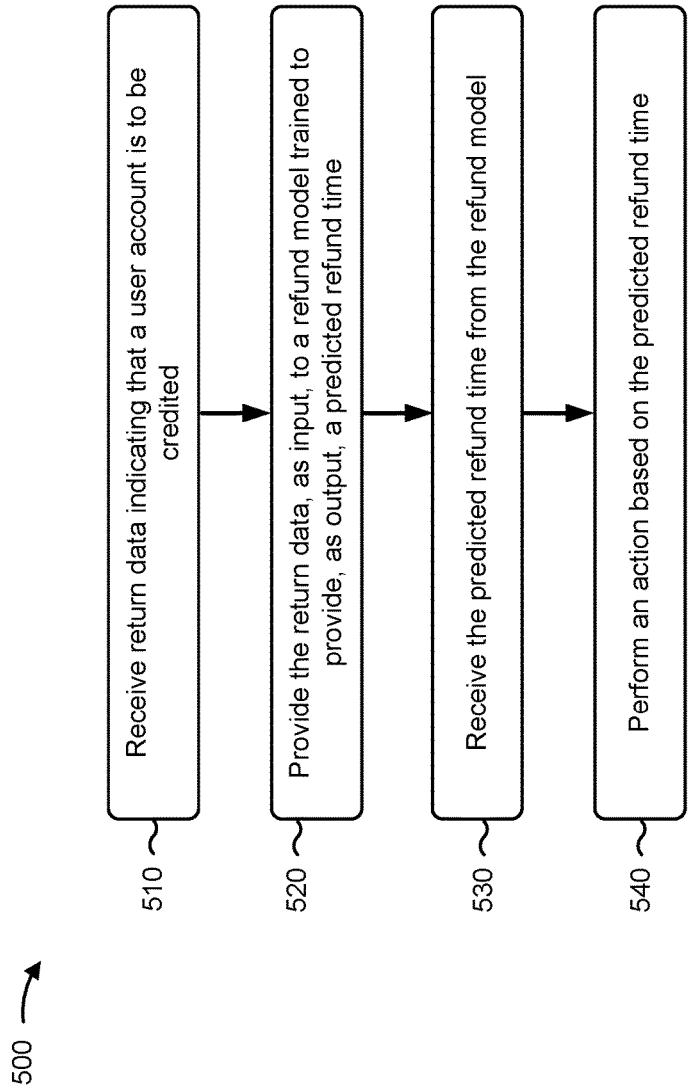

FIG. 5 is a flow chart of an example process 500 for predicting refund processing time. In some implementations, one or more process blocks of FIG. 5 may be performed by a refund management platform (e.g., refund management platform 240). In some implementations, one or more process blocks of FIG. 4 may be performed by another device or a group of devices separate from or including the refund management platform, such as a user device (e.g., user device 210), a merchant device (e.g., merchant device 220), a shipping device (e.g., shipping device 230), and/or the like.

As shown in FIG. 5, process 500 may include receiving return data indicating that a user account is to be credited (block 510). For example, a refund management platform (e.g., using computing resource 245, computing resource 245, processor 320, memory 330, storage component 340, input component 350, communications interface 370, and/or the like) may receive return data indicating that a user account is to be credited, as described, for example, in connection with FIGS. 1A and 1B. In some implementations, the return data includes at least one of: merchant data identifying a merchant, shipping data identifying a shipping entity, or account data identifying a user account entity.

As further shown in FIG. 5, process 500 may include providing the return data, as input, to a refund model trained to provide, as output, a predicted refund time (block 520). For example, the refund management platform (e.g., using computing resource 245, processor 320, memory 330, storage component 340, input component 350, output component 360, communications interface 370, and/or the like) may provide the return data, as input, to a refund model trained to provide, as output, a predicted refund time, as described, for example, in connection with FIGS. 1A and 1B. In some implementations, the predicted refund time specifies a time at which the user account is expected to be credited. In some implementations, the refund model was trained using historical refund data.

As further shown in FIG. 5, process 500 may include receiving the predicted refund time from the refund model (block 530). For example, the refund management platform (e.g., using computing resource 245, processor 320, memory 330, storage component 340, input component 350, communications interface 370, and/or the like) may receive the predicted refund time from the refund model, as described, for example, in connection with FIGS. 1A and 1B.

As further shown in FIG. 5, process 500 may include performing an action based on the predicted refund time (block 540). For example, refund management platform (e.g., using computing resource 245, processor 320, memory 330, storage component 340, input component 350, output component 360, communications interface 370, and/or the like) may perform an action based on the predicted refund time, as described, for example, in connection with FIGS. 1A and 1B.

Process 500 may include additional implementations, such as any single implementation or any combination of implementations described below and/or in connection with one or more other processes described elsewhere herein.

In some implementations, the return data is received from a user device associated with the user account. In some implementations, the return data is received from a merchant device, the merchant device being associated with the merchant and a merchant account from which a refund amount associated with the return data is to be credited.

In some implementations, the return data is received from a shipping device associated with the shipping entity, and the shipping data included in the return data specifies an estimated shipping time. In some implementations, the predicted refund time includes a time range.

In some implementations, the refund management platform may receive, from the refund model, a measure of confidence associated with the predicted refund time. In some implementations, when performing the action based on the predicted refund time, the refund management platform provides a user device with data indicating the predicted refund time and a prediction confidence indicator based on the measure of confidence associated with the predicted refund time.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
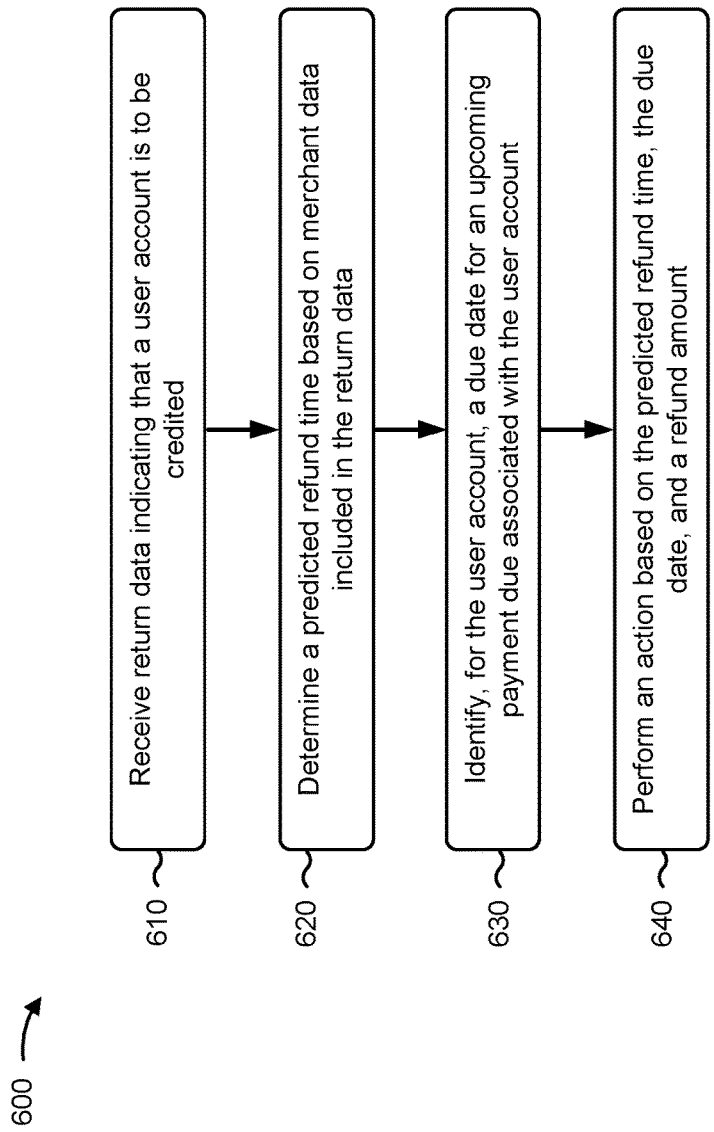

FIG. 6 is a flow chart of an example process 600 for predicting refund processing time. In some implementations, one or more process blocks of FIG. 6 may be performed by a refund management platform (e.g., refund management platform 240). In some implementations, one or more process blocks of FIG. 4 may be performed by another device or a group of devices separate from or including the refund management platform, such as a user device (e.g., user device 210), a merchant device (e.g., merchant device 220), a shipping device (e.g., shipping device 230), and/or the like.

As shown in FIG. 6, process 600 may include receiving return data indicating that a user account is to be credited (block 610). For example, a refund management platform (e.g., using computing resource 245, processor 320, memory 330, storage component 340, input component 350, communications interface 370, and/or the like) may receive, from a user device, return data indicating that a user account associated with the user device is to be credited, as described, for example, in connection with FIGS. 1A and 1B. In some implementations, the return data includes merchant data identifying a merchant.

As further shown in FIG. 6, process 600 may include determining a predicted refund time based on merchant data included in the return data (block 620). For example, the refund management platform (e.g., using computing resource 245, processor 320, memory 330, storage component 340, input component 350, output component 360, communications interface 370, and/or the like) may determine a predicted refund time based on the merchant data, as described, for example, in connection with FIGS. 1A and 1B. In some implementations, the predicted refund time specifies a time at which the user account is expected to be credited for a refund amount. In some implementations, the determination is made based on a refund model that was previously trained using historical refund data.

As further shown in FIG. 6, process 600 may include identifying, for the user account, a due date for an upcoming payment due associated with the user account (block 630). For example, the refund management platform (e.g., using computing resource 245, processor 320, memory 330, storage component 340, input component 350, output component 360, communications interface 370, and/or the like) may identify, for the user account, a due date for an upcoming payment due associated with the user account, as described, for example, in connection with FIGS. 1A and 1B.

As further shown in FIG. 6, process 600 may include performing an action based on the predicted refund time, the due date, and a refund amount (block 640). For example, refund management platform (e.g., using computing resource 245, processor 320, memory 330, storage component 340, input component 350, output component 360, communications interface 370, and/or the like) may perform an action based on the predicted refund time, the due date, and the refund amount, as described, for example, in connection with FIGS. 1A and 1B.

Process 600 may include additional implementations, such as any single implementation or any combination of implementations described below and/or in connection with one or more other processes described elsewhere herein.

In some implementations, performing the action based on the predicted refund time, the due date, and the refund amount, includes providing the user device with data indicating that the predicted refund time indicates that the refund amount will be credited to the user account before the due date.

In some implementations, performing the action based on the predicted refund time, the due date, and the refund amount, includes providing the user device with data indicating that the predicted refund time indicates that the refund amount will be credited to the user account after the due date.

In some implementations, performing the action based on the predicted refund time, the due date, and the refund amount, includes providing, based on the due date and the predicted refund time, the user device with a recommendation to pay a predicted payment amount for the upcoming payment due, the predicted payment amount being less than the upcoming payment due.

In some implementations, determining the predicted refund time based on the merchant data includes providing the return data as input to a return model and receiving the predicted refund time as output from the return model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, a refund management platform 240 may enable merchants, consumers, and/or the like, to receive predictions regarding refund processing time, which may enable the merchants, consumers, and/or the like, to use the predictions in a variety of ways. For example, predicted refund processing times may be used for financial planning (e.g., making plans based on when a refund will be credited to a user account), customer service (e.g., providing a consumer or merchant with knowledge regarding when a refund is predicted to be processed), and/or the like. Several different stages of the process for predicting refund processing time are automated, which may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for predicting refund processing time conserves computing resources (e.g., processor resources, memory resources, and/or the like) that would otherwise be wasted by using manual investigative processes for attempting to determine when a refund will be processed.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a device, historical refund data,
      the historical refund data including at least one of:
         merchant refund time data,
         shipping time data, or
         user account refund time data;
   generating, by the device and based on the historical refund data, a refund model,
      the refund model being trained to receive, as input, at least one of:
         merchant data identifying a merchant,
         shipping data identifying a shipping entity, or
         account data identifying a user account entity;
   receiving, by the device, return data indicating that a user account is to be credited,
      the return data including the merchant data;
   determining, by the device, a predicted refund time based on the return data and the refund model; and
   performing, by the device, an action based on the predicted refund time.

2. The method of claim 1, wherein the historical refund data is received from one or more user devices,
   each user device, included in the one or more user devices, being associated with a corresponding user account.

3. The method of claim 1, wherein the historical refund data is received from one or more merchant devices,
   each merchant device, included in the one or more merchant devices, being associated with a corresponding merchant.

4. The method of claim 1, wherein the historical refund data is received from one or more shipping devices,
   each shipping device, included in the one or more shipping devices, being associated with a corresponding shipping entity.

5. The method of claim 1, wherein the merchant refund time data indicates a period of time between the merchant receiving refund instructions and the user account entity receiving credit instructions to credit an amount associated with the credit instructions.

6. The method of claim 1, wherein the shipping time data indicates a period of time between the shipping entity receiving a product and the merchant receiving the product.

7. The method of claim 1, wherein the user account refund time data indicates a period of time between the user account entity receiving credit instruct instructions and the user account entity crediting a refund amount.

8. The method of claim 1, wherein performing the action based on the predicted refund time comprises:
   providing, to a merchant device associated with the merchant data, with data indicating the predicted refund time.

9. A device comprising:
   one or more memories; and
   one or more processors, communicatively coupled to the one or more memories, configured to:
      receive return data indicating that a user account is to be credited,
         the return data including at least one of:
            merchant data identifying a merchant,
            shipping data identifying a shipping entity, or
            account data identifying a user account entity;
      provide the return data, as input, to a refund model trained to provide, as output, a predicted refund time,
         the predicted refund time specifying a time at which the user account is expected to be credited, and the refund model having been trained using historical refund data;

receive the predicted refund time from the refund model; and perform an action based on the predicted refund time.

10. The device of claim 9, wherein the return data is received from a user device associated with the user account.

11. The device of claim 9, wherein the return data is received from a merchant device, the merchant device being associated with the merchant and a merchant account from which a refund amount associated with the return data is to be credited.

12. The device of claim 9, wherein:

the return data is received from a shipping device associated with the shipping entity; and the shipping data included in the return data specifies an estimated shipping time.

13. The device of claim 9, wherein the predicted refund time includes a time range.

14. The device of claim 9, wherein the one or more processors are further configured to:

receive, from the refund model, a measure of confidence associated with the predicted refund time.

15. The device of claim 14, wherein the one or more processors, when performing the action based on the predicted refund time, are further configured to:

provide a user device with data indicating the predicted refund time and a prediction confidence indicator based on the measure of confidence associated with the predicted refund time.

16. A non-transitory computer-readable medium storing instructions, the instructions comprising:

one or more instructions that, when executed by one or more processors, cause the one or more processors to:

receive, from a user device, return data indicating that a user account associated with the user device is to be credited, the return data including merchant data identifying a merchant;

determine a predicted refund time based on the merchant data, the predicted refund time specifying a time at which the user account is expected to be credited for a refund amount, and the determination being made based on a refund model that was previously trained using historical refund data;

identify, for the user account, a due date for an upcoming payment due associated with the user account; and perform an action based on the predicted refund time, the due date, and the refund amount.

17. The non-transitory computer-readable medium of claim 16, wherein the one or more instructions, that cause the one or more processors to perform the action based on the predicted refund time, the due date, and the refund amount, cause the one or more processors to:

provide the user device with data indicating that the predicted refund time indicates that the refund amount will be credited to the user account before the due date.

18. The non-transitory computer-readable medium of claim 16, wherein the one or more instructions, that cause the one or more processors to perform the action based on the predicted refund time, the due date, and the refund amount, cause the one or more processors to:

provide the user device with data indicating that the predicted refund time indicates that the refund amount will be credited to the user account after the due date.

19. The non-transitory computer-readable medium of claim 16, wherein the one or more instructions, that cause the one or more processors to perform the action based on the predicted refund time, the due date, and the refund amount, cause the one or more processors to:

provide, based on the due date and the predicted refund time, the user device with a recommendation to pay a predicted payment amount for the upcoming payment due, the predicted payment amount being less than the upcoming payment due.

20. The non-transitory computer-readable medium of claim 16, wherein the one or more instructions, that cause the one or more processors to determine the predicted refund time based on the merchant data, cause the one or more processors to:

provide the return data as input to a return model; and receive the predicted refund time as output from the return model.

* * * * *